United States Patent [19]
Rubtsov et al.

[11] Patent Number: 5,426,474
[45] Date of Patent: Jun. 20, 1995

[54] LIGHT PROJECTION SYSTEM USING RANDOMIZED FIBER OPTIC BUNDLE

[75] Inventors: Vladimir Rubtsov, Los Angeles; Roger C. Young, Yorba Linda, both of Calif.

[73] Assignee: Innersense, Inc., Pacific Palisades, Calif.

[21] Appl. No.: 215,931

[22] Filed: Mar. 22, 1994

[51] Int. Cl.6 .............................................. G03B 21/00
[52] U.S. Cl. ............................................... 353/84; 353/1; 362/32; 359/616
[58] Field of Search ................... 353/84, 122, 1, 46, 353/48, 49, 82, 42; 359/616; 362/32, 293

[56] References Cited

U.S. PATENT DOCUMENTS

| | | | |
|---|---|---|---|
| 3,195,405 | 7/1965 | Clark et al. | 353/84 |
| 3,763,575 | 10/1973 | Cohen et al. | 40/68.4 |
| 3,825,336 | 7/1974 | Reynolds | 355/1 |
| 4,057,338 | 11/1977 | Yevick | 355/1 |
| 4,439,157 | 3/1984 | Breglia et al. | 434/40 |
| 4,454,568 | 6/1984 | Stadnik | 362/32 |
| 4,681,414 | 7/1987 | Hershel | 353/122 |
| 4,799,103 | 1/1989 | Muckerheide | 353/6 |
| 4,870,268 | 9/1989 | Vincent et al. | 250/226 |
| 4,917,487 | 4/1990 | Cruickshank | 353/46 |
| 4,931,859 | 6/1990 | Dillard et al. | |
| 5,012,274 | 4/1991 | Dolgoff | 340/702 |
| 5,022,750 | 6/1991 | Flasck | 353/31 |
| 5,086,378 | 2/1992 | Prince | 362/103 |

*Primary Examiner*—William A. Cuchlinski, Jr.
*Assistant Examiner*—William C. Dowling
*Attorney, Agent, or Firm*—Pretty, Schroeder, Brueggemann & Clark

[57] ABSTRACT

A projection system using a randomized fiber optic bundle for generating a wide variety of fluid visual images. A light source focusses light through a multiple color filter onto the input end of a fiber optic bundle having a plurality of optical fibers and held in a cylindrical shape. The fiber optic bundle includes a plurality of fiber optic groups that are interwoven such that the arrangement of the fiber optic groups at the fiber optic bundle's input end is different from the arrangement of the fiber optic groups at the fiber optic bundle's output end. The multiple color filter is movable such that light of time-varying color is directed into each of the optical fibers. The time-varying colored light is received by a projection lens and imaged at a target.

16 Claims, 3 Drawing Sheets

LIGHT PROJECTION SYSTEM USING RANDOMIZED FIBER OPTIC BUNDLE

BACKGROUND OF THE INVENTION

This invention relates generally to light pattern generators and, more particularly, to a light projection system for generating light patterns through a randomized fiber optic bundle.

Kaleidoscopes are used to generate changing and complex visual effects. However, they are limited in their usefulness because the visual image cannot be easily enlarged and displayed on a screen or other surface. In the past, musicians have created hand-held light pattern generators for producing a colorful, manually-controllable pattern on an adjacent screen. These generators direct white light through three color wheels and into three fiber optic bundles. The remote ends of the three bundles are not fixed and can be manually manipulated to generate a seemingly random pattern. Colored light emitted from the fiber optic bundles is directed through a kaleidoscopic objective lens for projection on a screen.

While such hand-held light pattern generators can create a wide variety of patterns, they require human interaction to change the pattern. A randomized visual image is created only when a human hand manipulates the position of the remote ends of the fiber optic bundles or when a different color wheel is selected. Further, the time-varying visual image tends to jerk and flash, and it is not smooth, with fluid-like flowing changes.

Accordingly, there is a need for a visual image generator that creates a wide variety of visual images without requiring human interaction. Further, it should be appreciated that there is also a need for a projection system that provides smooth, fluid-like flowing visual images, without jerking and flashing. The present invention provides the necessary solutions.

SUMMARY OF THE INVENTION

The present invention is embodied in a projection system using a randomized fiber optic bundle for generating a wide range of visual images without requiring human interaction. The projection system of the present invention provides a fluid-like visual image that is bright and crisp. The image smoothly changes in different directions to create interesting and ever changing designs.

More particularly, the projection system of the present invention includes a housing, a light source, and a multiple color filter mounted within the housing to receive light from the light source. The filter includes a plurality of discrete colored regions. A fiber optic bundle held in a predetermined shape (e.g., a cylinder) includes a large number of optical fibers forming an input end and an output end fixed within the housing. The fiber optic bundle includes a plurality of fiber optic groups that are interwoven such that the arrangement of the fiber optic groups at the fiber optic bundle's input end is different from the arrangement of the fiber optic groups at the fiber optic bundle's output end. The fiber optic bundle is mounted such that light from the light source is directed through the multiple color filter onto the input end of the fiber optic bundle. Further, the multiple color filter is movable relative to the input end of the fiber optic bundle such that light of time-varying color is directed into each of the plurality of optical fibers. A projection lens receives light from the fiber optic bundle's output end and images it at a target, such as a remote screen.

In other, more detailed features of the invention, the multiple color filter includes a color wheel with a plurality of irregularly shaped colored regions, and the projection system further includes a first motor for rotating the color wheel and a second motor for reciprocating the color wheel laterally with respect to the longitudinal axis of the fiber optic bundle. As the color wheel rotates, the second motor moves the color wheel over a range that brings the center and the periphery of the wheel adjacent to the input end of the fiber optic bundle.

Accordingly, the light source and the input end of the fiber optic bundle remain stationary, while the color wheel rotates and moves laterally to allow light to pass through varying radial portions of the color wheel. In this manner, light passing through the color wheel traces a sine wave pattern. As different colored regions of the color wheel pass in front of the bundle, the color of the light entering the fiber optic bundle changes in a sweeping motion. Thus, the colors entering the individual fibers of a fiber optic group do not change simultaneously, but rather in sequence in a direction correlated to the rotation of the color wheel. Further, the randomization of the fiber optic groups at the output end of the bundle divides and rotates the sweeping change such that the projected image blends the color transformation from different directions in a fluid motion.

Other details of the present invention include moving the multiple color filter at a speed that satisfies the following equation:

$$L_F/RR < S < L_{FOG}/RR$$

where $L_F$ is the smallest cross-sectional dimension of the individual fibers, RR is the response and relaxation time of the human eye, S is the linear speed at which the multiple color filter moves, and $L_{FOG}$ is the smallest cross-sectional dimension of the smallest fiber optic group. This speed provides an appealing, fluid-like visual image. At slower speeds, the visual effect can be jerky and blinking, while at faster speeds, the visual effect can be flickering and strobelike.

Additional features include sizing the irregularly shaped colored regions of the multiple color filter such that the smallest cross-sectional dimension of the smallest fiber optic group is not less than the smallest cross-sectional dimension of the smallest colored region, which in turn is not less than the smallest cross-sectional dimension of the individual fibers. This sizing provides substantially continuous color movement across the fiber optic groups and produces a fluid visual image.

Other features and advantages of this invention should become apparent from the following description of the preferred embodiment, taken in conjunction with the accompanying drawings, which illustrate, by way of example, the principles of the invention.

DESCRIPTION OF THE PREFERRED EMBODIMENT

The following description of the preferred embodiment of the invention is not to be taken in a limiting sense, but is made merely for the purpose of illustrating the general principles of the invention. The description is of the best mode presently contemplated for carrying out the invention.

Figure 1:
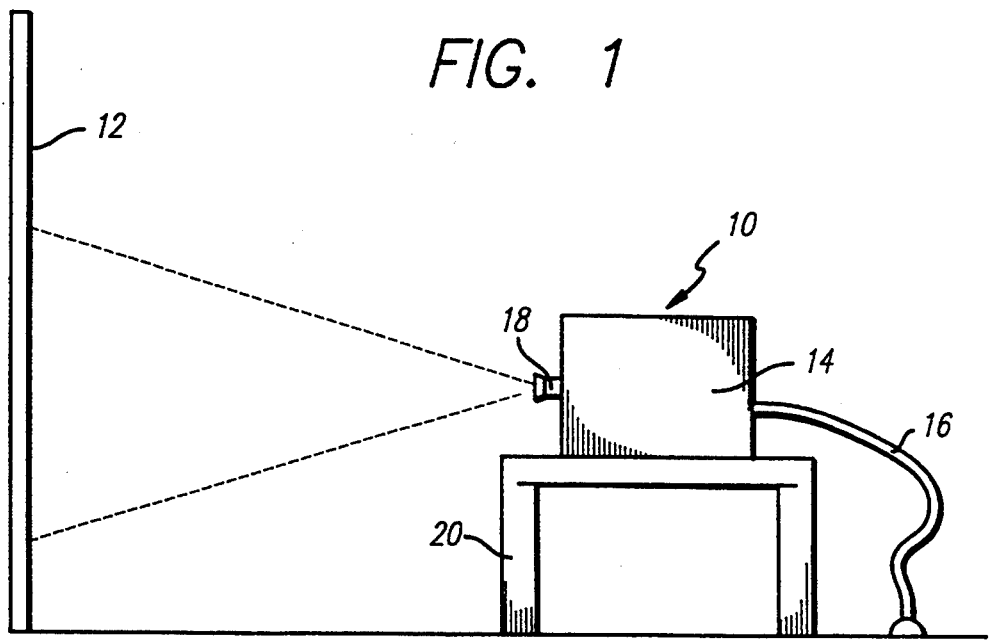
FIG. 1 is a schematic diagram of a fiber optic projection assembly according to the present invention, shown projecting a visual image on a screen.

With reference to FIG. 1, there is shown a fiber optic projection system 10 for projecting a fluid light image onto a target, such as a screen 12. The projection system includes a housing 14 from one end of which extends a power cord 16, while a projection lens 18 projects from the other end. The projection system is shown resting on a table top 20, to raise it above the floor and thereby project a full visual image onto the screen.

Figure 2:
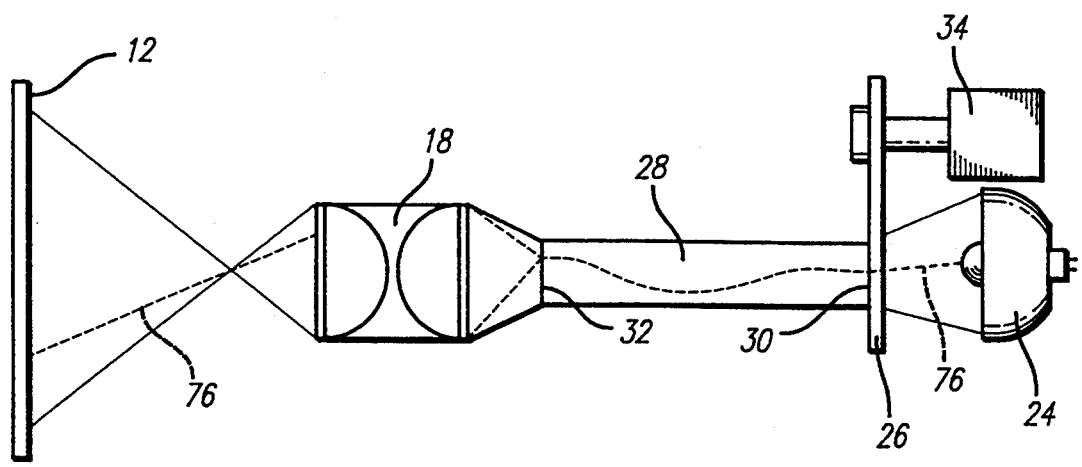
FIG. 2 is a schematic diagram of the internal components of the projection system of the present invention.

With reference now to FIG. 2, the internal components of the projection system 10 are illustrated generally. In the preferred embodiment, a light source 24 is mounted within the housing 14 and it is connected to the power cord 16 so that the light source can produce substantially white light having a power preferably in the range of 50 to 3000 watts. The light from the light source is focussed through a multiple color filter 26 onto an input end 30 of a fiber optic bundle 28 held in a predetermined shape. In the preferred embodiment, the fiber optic bundle's shape is cylindrical. The fiber optic bundle includes a plurality of individual fibers forming the input end 30 (FIG. 6) and an output end 32 (FIG. 7). The multiple color filter 26 is mounted between the light source 24 and the input end of the fiber optic bundle.

The multiple color filter 26 is movable relative to the input end 30 of the fiber optic bundle 28 such that light of time-varying color is directed into each of the optical fibers in the bundle. In the preferred embodiment, a first motor 34 is included in the housing 14, for rotating the multiple color filter relative to the input end of the fiber optic bundle. The projection lens 18 receives light from the output end 32 of the fiber optic bundle and images the light at a target, for example the screen 12. Alternatively, the projection lens can image the light at a target secured to the housing.

Figure 3:
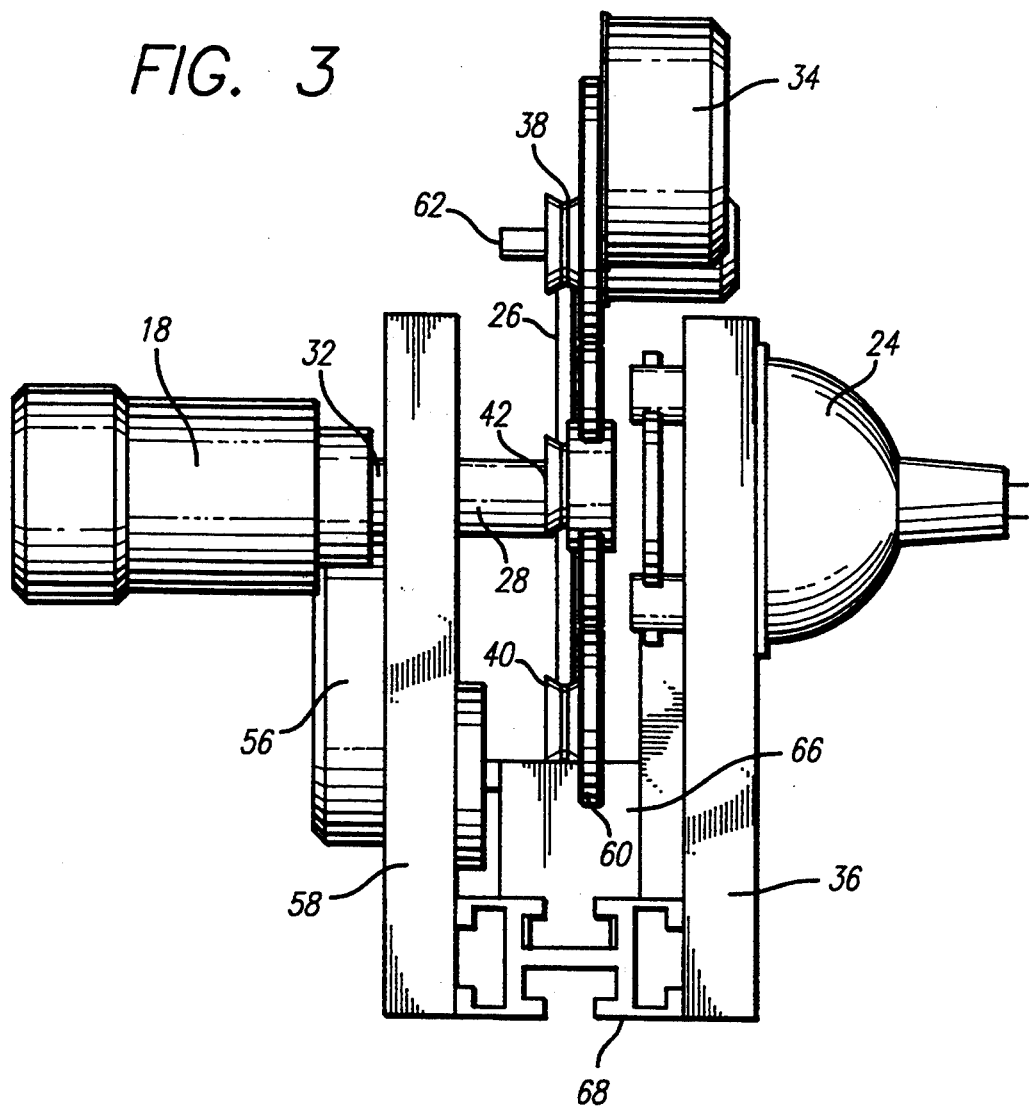
FIG. 3 is a side elevational view of the light projection system of the present invention, illustrating some of the detailed features of the invention.
Figure 4:
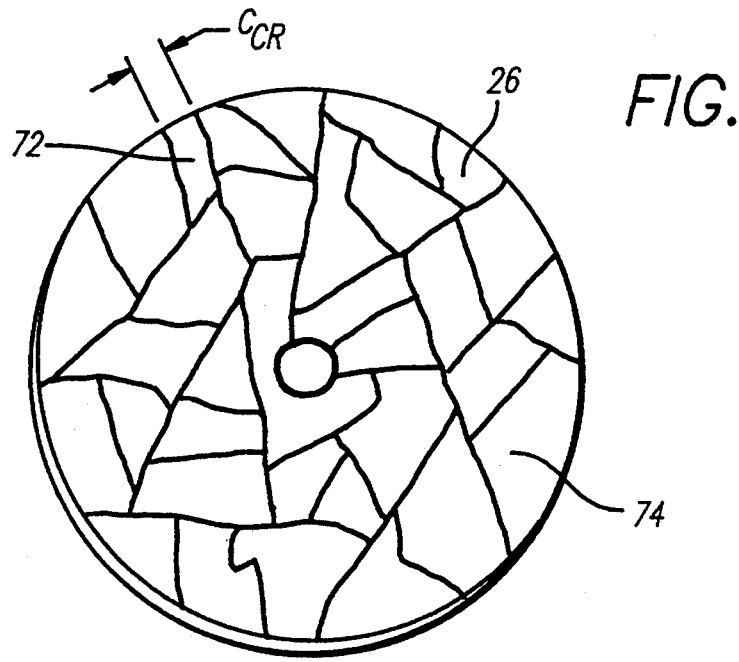
FIG. 4 is an elevational view of a color wheel that includes a plurality of irregularly shaped colored regions in accordance with a detailed feature of the invention.

FIGS. 3 through 7 illustrate the fiber optic projection system 10 of the present invention in additional detail. The system includes a first heat sink 36 that conducts heat away from the light source 24. In the preferred embodiment, the multiple color filter 26 is a color wheel (FIG. 4). The color wheel is mounted on a plurality of rollers 38, 40 and 42 (FIGS. 3 and 5) and the first motor 34 rotates the color wheel by driving the roller 38. Additionally, the projection lens 18 is mounted directly onto the output end 32 of the fiber optic bundle 28, to limit the loss of light between the components and to produce a crisp and clear visual image on the screen 12.

Figure 6:
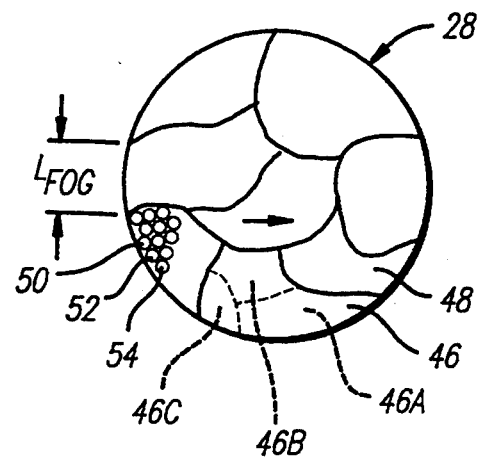
FIG. 6 is a schematic diagram of the input end of the fiber optic bundle, illustrating the movement of color across the individual fibers in each fiber optic group.
Figure 7:
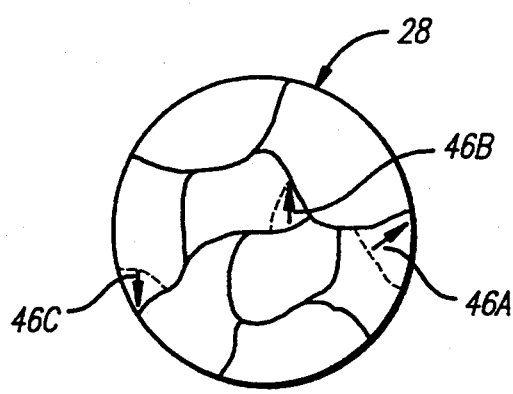
FIG. 7 is a schematic diagram of the output end of the same fiber optic bundle, illustrating the change of direction of the color movement across the individual fibers in each fiber optic group due to the randomization of the fiber optic groups.

As shown in FIGS. 6 and 7, the fiber optic bundle 28 includes a plurality of fiber optic groups, for example, groups 46 and 48, that are interwoven such that the arrangement of the fiber optic groups at the fiber optic bundle's input end 30 (FIG. 6) is different from the arrangement of the fiber optic groups at the fiber optic bundle's output end 32 (FIG. 7). Each of the fiber optic groups includes a large plurality of individual fibers, such as fibers 50, 52 and 54.

Figure 5:
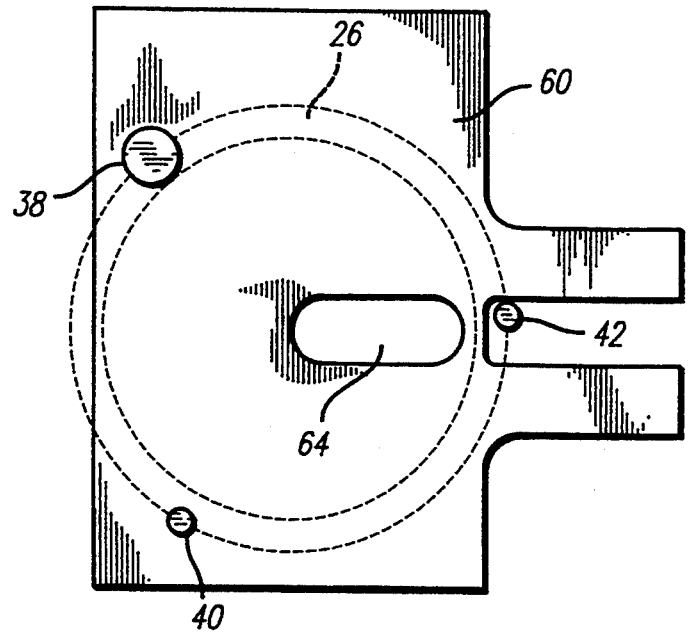
FIG. 5 is an elevational view of a multiple color filter mounting plate, including an aperture and rollers for mounting and rotating a color wheel.

The preferred embodiment of the invention also includes a second motor 56 for reciprocating the color wheel 26 laterally with respect to the longitudinal axis of the fiber optic bundle 28. A second heat sink 58 is further included, for conducting heat away from the second motor and the fiber optic bundle 28. As illustrated in FIGS. 3 and 5, the first motor 34 is fixed to a mounting plate 60, and an axle 62 extends between the first motor and the roller 38, for driving the roller 38 to rotate the color wheel 26 (shown ghosted in FIG. 5). The mounting plate is opaque and includes a generally oval aperture 64 having a length approximately equal to the radius of the color wheel and a width approximately equal to the diameter of the fiber optic bundle 28. The mounting plate is positioned between the color wheel and the light source 24, with the aperture aligned with the input end 30 of the fiber optic bundle. This positioning of the mounting plate shields most of the color wheel 26 from heat from the light source 24, yet allows light to pass through the aperture to the color wheel and then into the fiber optic bundle.

Additionally, the preferred embodiment of the invention includes a slide 66 that rests in a track 68 extending laterally with respect to the longitudinal axis of the fiber optic bundle 28. The second motor 56 is coupled to the slide and through the slide to the mounting plate 60 and the color wheel 26. The second motor is sized to move the mounting plate laterally in a range such that the input end 30 of the fiber optic bundle is traversed by substantially the entire length of the aperture 64.

Accordingly, in the preferred embodiment, the light source 24 and the input end 30 of the fiber optic bundle 28 are fixed within the housing 14, while the mounting plate 60 and the color wheel 26 move laterally in a range substantially equal to the radius of the color wheel. This lateral movement allows light to pass through varying radial portions of the color wheel, such that the center and the periphery of the wheel, and all radial locations therebetween, are adjacent to the input end 30 of the fiber optic bundle 28 during each cycle of the reciprocating motion. Since the color wheel is rotating, as well as moving laterally, light passing through the color wheel traces a variable sine wave pattern to expose substantially all of the radial portions of the color wheel to the light source 24. Of course, the lateral movement of the mounting plate and color wheel can be varied over time to move longer or shorter distances to provide variety in the portions of the color wheel exposed to the light source. In an alternative embodiment, not shown in the drawings, the output end 32 of the fiber optic bundle 28 is reciprocally moved laterally relative to the projection lens 18.

In a detailed embodiment of the present invention, the color wheel 26 includes a plurality of irregularly shaped colored regions, such as regions 72 and 74 (FIG. 4). The size and the shape of the colored regions relative to the size of the fiber optic groups 46 and 48 and the individual fibers that form each group determines the fluidity of the movement of the visual image produced by the projection system 10.

In this embodiment, the color wheel 26 includes a heat-resistant glass cut in a circular pattern to form a transparent glass disk. The small colored regions 72 and 74 are made from stained glass, dichroic filter material, acrylic, polyester, or colored gel. Alternatively, the colored regions can be made by evaporating, spreading, spraying, or silkscreening dye-staff or ultra-violet ink on the glass disk. A layer of optically transparent cement is spread onto the surface of the glass disk. The individual colored regions are then placed onto the surface of the disk to form a color mosaic. The colored regions are placed as close together as possible, to minimize the amount of uncolored space between regions and thereby minimize the uncolored light that reaches the fiber optic bundle 28.

The individual colored regions of the color wheel 26 can be any shape and size. To create a fluid visual image, the smallest cross-sectional dimension of the smallest colored region should satisfy the following equation:

$$L_{FOG} \geq L_{CR} \geq L_F$$

where $L_{FOG}$ is the smallest cross-sectional dimension of the smallest fiber optic group (FIG. 6), $L_{CR}$ is the smallest cross-sectional dimension of the smallest colored region (FIG. 4), and $L_F$ is the smallest cross-sectional dimension of the individual fibers 50, 52 and 54. In the preferred embodiment, the smallest cross-sectional dimension of the smallest colored region ($L_{CR}$) is substantially equal to the smallest cross-sectional dimension of the fibers ($L_F$).

As described above, the fiber optic bundle 28 includes a plurality of fibers, such as fibers 50, 52 and 54, that are grouped into fiber optic groups, such as groups 46 and 48. More specifically, each of the fiber optic groups is formed by a plurality of individual, flexible, light transmitting optic fibers, each of which has an input end and an output end. Each of the flexible fibers is formed by an inner core and an outer sheath having an index of refraction that is lower than that of the inner core. The interface between the sheath and the core provides an environment for highly efficient light transmission along the length of the fiber, by multiple internal reflections. Since the light is substantially internally reflected, the fiber may be bent or curved without significant loss of light. The individual fibers may be made of coated glass or coated plastic. Glass fibers are more suitable for high temperature applications, but are less flexible than the plastic fibers. The incorporation of a fiber optic bundle in the present invention creates a crisp and bright visual image, because little light is lost between the light source 24 and the projection lens 18.

The fiber optic groups 46 and 48 are incoherent in nature, meaning that the arrangement of the fiber optic groups at the fiber optic bundle's input end 30 is different from the arrangement of the fiber optic groups at the fiber optic bundle's output end 32. More specifically, the fiber optic groups themselves are divided into subgroups that are interwoven along the length of the fiber optic bundle 28 in a random manner. By incorporating incoherent fiber optic groups, the light image entering the input end of the fiber optic bundle is scrambled before it is received by the projection lens 18 and then imaged at the screen 12.

In the preferred embodiment, the fiber optic bundle 28 is constructed by first selecting an external sheath to function as a clamp for the fiber optic groups, e.g., groups 46 and 48, in the fiber optic bundle. The material used as a sheath can be any well known material used in the preparation of fiber optic bundles, such as stainless steel or brass. The internal surface of the sheath should be reflective and the length and the width of the sheath is determined by the design and the application of the projection system 10. The selected diameter of the sheath will influence the number of fiber optic groups in the fiber optic bundle 28. In the preferred embodiment, at least two fiber optic groups are included in the fiber optic bundle.

When first constructing the fiber optic bundle 28 in the preferred embodiment, each fiber optic group 46 and 48 is made to include a plurality of individual fibers gathered together. One end of each raw fiber group is immersed in alcohol, to bind the individual fibers together. The opposite end of each raw fiber group is left unbound. The unbound ends of the fiber optic groups are pulled through the sheath, while the bound ends extend from the end of the sheath by an inch or more. Next, the unbound raw fibers of each fiber optic group are divided into subgroups and all the subgroups of all the fiber optic groups are mixed and partially randomized with each other. Then, the fiber optic bundle is dried to evaporate the alcohol on the bound ends of the fiber optic groups.

In the preferred embodiment, after the fiber optic bundle 28 has dried, the ends of the bundle are cut approximately one inch from the ends of the sheath, and cemented with a UV-curable transparent optical cement commonly used in the preparation of fiber optic bundles, such as Norland NOA-72 cement. Next, the ends of the fiber optic bundle protruding from the sheath are tightly bound by wrapping them with a suture to remove any spaces between the bundles. The fiber optic bundle is then dried again in an oven, for a time period determined by the type of cement used. Finally, the ends of the fiber optic bundle protruding from the sheath are cut, ground, and polished.

With reference again to FIG. 2, by way of example, the path of a ray of light 76 through the projection system 10 and, in particular, through the fiber optic bundle 28 is shown as a dashed line. The light source 24 emits the ray of light that is focussed through the multiple color filter 26 onto the input end 30 of the fiber optic bundle. As the ray of light passes through the multiple color filter, it is filtered to a particular color and the colored light is then transmitted through an individual fiber to the output end 32 of the fiber optic bundle. Due to the incoherent nature of the bundle, the position of the fiber's fiber optic group, and therefore the fiber's position is different at the output end from its position at the input end. Accordingly, although the ray of light is shown to have entered the fiber optic bundle near the bundle's center, it exits the bundle near the top. Since the projection lens 18 inverts the image emitted by the fiber optic bundle, the same ray of light is imaged near the bottom of the visual image displayed on the screen 12.

The visual image created by the present invention changes when the multiple color filter 26 moves. With reference again to FIGS. 6 and 7, as the multiple color filter moves over time, the color of the light entering the fiber optic bundle 28 changes, as different colored regions of the color filter pass in front of the fiber optic groups 46 and 48. Thus, light of time-varying color enters each of the plurality of optical fibers that make up the fiber optic bundle.

For example, if the multiple color filter 26 includes a red color region and a blue color region, and it moves laterally from left to right, the light entering the fibers in the fiber optic groups 46 and 48 would change from red to blue from left to right over time as the multiple color filter moves. This movement is indicated by the arrow in FIG. 6. Light entering the left-most fiber in each fiber optic group would change color first. Then the light entering the fiber located to the right of that fiber would change color, and so on across the fiber optic group, from left to right.

As discussed above, the fiber optic groups, e.g., groups 46 and 48, are incoherent in nature and the arrangement of the fiber optic groups at the fiber optic bundle's input end 30 (FIG. 6) is different from the arrangement of the fiber optic groups at the fiber optic bundle's output end 32 (FIG. 7). In the preferred embodiment, each group of fibers at the input end is divided into a plurality of multi-fiber subgroups. Thus, in FIG. 6, the fiber optic group 46 is shown to include subgroups 46A, 46B and 46C. The subgroups from all of the groups are randomized along the length of the fiber optic bundle 28, such that the originally associated subgroups are separated from each other. Thus, the subgroups 46A, 46B and 46C are shown in FIG. 7 to be in separated orientations at the fiber optic bundle's output end.

The randomizing of the fiber optic subgroups includes random rotation. Thus, the general direction of color change in each subgroup will differ at the fiber bundle's output end 32 as compared to its input end 30. In the example of FIGS. 6 and 7, the direction of color change for the subgroups 46A, 46B and 46C is shown by the arrow initially to be from left to right, but after randomization of the fiber subgroups is shown by the arrows to be in completely different directions.

The speed at which the colors entering the individual fibers change is correlated to the speed of the multiple color filter 26. In the preferred embodiment, the multiple color filter moves at a speed that satisfies the following equation:

$$L_F/RR < S < L_{FOG}/RR$$

where $L_F$ is the smallest cross-sectional dimension of the fibers, RR is the response and relaxation time of the human eye (approximately 1/16 second), S is the speed of the multiple color filter, and $L_{FOG}$ is the smallest cross-sectional dimension of the smallest fiber optic group. This speed creates a smooth blending of color changes such that the viewer does not perceive individual changes in the points of light emitted by the individual fibers. A pleasing fluid-like color transformation thereby is provided.

The arrangement of the colored regions on the multiple color filter 26 also influences the visual image created. More specifically, the colored regions on the color wheel can be arranged in any sequence and distribution, however, different arrangements will create different time-varying visual images. For example, a generally randomized distribution of colored regions of different colors and shades will create a visual image of continuously changing shapes and colors. One alternative arrangement divides the color wheel into substantially equal segments, and each segment includes colored regions of varying shades of a base color. For example, the color wheel can be divided into four equal segments formed by two perpendicular diameters. One segment can include colored regions of varying shades of red, while another segment can include colored regions of varying shades of blue, and so on. This arrangement creates a visual image with dynamic shades and hues of individual color when the color wheel moves radially, and rotation of the wheel sequences through the base colors of the segments.

Another arrangement of the color wheel divides the wheel into concentric circular and ring-shaped segments, and each segment includes colored regions of varying shades of a base color. For example, the color wheel can be divided into three concentric segments. The innermost circular segment can include colored regions of varying shades of blue, while the ring-shaped segment radially adjacent to the circular segment can include colored regions of varying shades of green. Finally, the outermost ring-shaped segment can include colored regions of varying shades of red. This arrangement creates a visual image where the portions of the visual image including the exterior base color, red in the example, will change and blend faster than the portions of the visual image including the central base color, blue in the example.

It should be appreciated from the foregoing description that the present invention provides a novel and unique fiber optic projection system. Fluid visual images are created by rotating and randomizing fibers in a fiber optic bundle. The light projection system produces a wide variety of images without requiring human interaction.

Although the invention has been described in detail with reference to the presently preferred embodiment, those of ordinary skill in the art will appreciate that various modifications can be made without departing from the invention. For example, the multiple color filter can be any shape, such as square, rectangular or triangular. Additionally, colored fluids contained in movable tubes can be utilized as a multiple color filter. The pattern of the colored regions can also be varied from a random distribution of colors to a radiating pattern of changing colors, or to any other pattern that creates a pleasing visual image.

Moreover, in the preferred embodiment, the light source is mounted in the housing. However, an external light source, such as a desk lamp, can also be utilized. Finally, it is not a requirement that the multiple color filter move. Instead, the fiber optic bundle and the projection lens can move relative to the multiple color filter. Accordingly, the invention is defined only by the following claims.

I claim:

1. A fiber optic projection system, comprising:
   a housing;
   a light source;
   a multiple color filter mounted in the housing to receive light from the light source and having a plurality of discrete colored regions;
   a fiber optic bundle held in a predetermined shape and having a plurality of optical fibers forming an input end and an output end fixed in the housing, the fiber optic bundle including a plurality of fiber optic groups that are interwoven such that the arrangement of the fiber optic groups at the fiber optic bundle's input end is different from the arrangement of the fiber optic groups at the fiber optic bundle's output end;

wherein the fiber optic bundle is mounted such that light from the light source is directed through the multiple color filter onto the input end of the fiber optic bundle and wherein the multiple color filter is movable relative to the input end of the fiber optic bundle such that light of time-varying color is directed into each of the plurality of optical fibers; and a projection lens for receiving light from the fiber optic bundle's output end and imaging the light at a target.

2. The fiber optic projection system of claim 1, wherein the multiple color filter comprises a color wheel with a plurality of irregularly shaped colored regions.

3. The fiber optic projection system of claim 2, and further including:

a first motor for rotating the color wheel; and a second motor for reciprocating the color wheel laterally with respect to the longitudinal axis of the fiber optic bundle.

4. The fiber optic projection system of claim 3, wherein the second motor is sized so that the color wheel moves in a range such that the center of the wheel and the periphery of the wheel are, at times, adjacent to the input end of the fiber optic bundle.

5. The fiber optic projection system of claim 3, wherein:

the color wheel is mounted for rotation between a plurality of rollers; and the first motor drives one of the rollers.

6. The fiber optic projection system of claim 3, and further including:

a first heat sink for conducting heat away from the light source; and a second heat sink for conducting heat away from the fiber optic bundle.

7. The fiber optic projection system of claim 2, wherein:

the irregularly shaped colored regions of the color wheel have a smallest cross-sectional dimension;

the fiber optic groups are of variable size, with the smallest of such groups having a smallest cross-sectional dimension;

the optical fibers all have substantially the same cross-sectional dimension;

the smallest cross-sectional dimension of the smallest fiber optic group is not less than the smallest cross-sectional dimension of the smallest colored region; and the smallest cross-sectional dimension of the smallest colored region is not less than the cross-sectional dimension of the fibers.

8. The fiber optic projection system of claim 7, wherein the smallest cross-sectional dimension of the smallest fiber optic group is substantially equal to the smallest cross-sectional dimension of the smallest colored region.

9. The fiber optic projection system of claim 2, wherein the color wheel comprises a transparent glass disk with transparent colored materials affixed to the glass to disk to form a color mosaic.

10. The fiber optic projection system of claim 1, wherein:

the fiber optic groups are of variable size, with the smallest of such groups having a smallest cross-sectional dimension;

the optical fibers all have substantially the same cross-sectional dimension; and the multiple color filter moves at a speed that satisfies the following equation:

$$L_F/RR < S < L_{FOG}/RR$$

where $L_F$ is the cross-sectional dimension of the fibers, RR is the response and relaxation time of the human eye, S is the speed at which the multiple color filter moves, and $L_{FOG}$ is the smallest cross-sectional dimension of the smallest fiber optic group.

11. The fiber optic projection system of claim 1, and further including a color filter mounting plate for shielding the multiple color filter from heat from the light source, mounted in the housing between the light source and the multiple color filter, the mounting plate being opaque and having an aperture through which light from the light source passes.

12. The fiber optic projection system of claim 1, wherein the projection lens is mounted directly onto the output end of the fiber optic bundle.

13. The fiber optic projection system of claim 1, wherein the orientation of at least one fiber optic group at the output end of the fiber optic bundle is rotated from its orientation at the input end of the fiber optic bundle.

14. The fiber optic projection system of claim 1, wherein the light source is mounted within the housing.

15. The fiber optic projection system of claim 1, wherein the fiber optic bundle is held in a cylindrical shape.

16. A fiber optic projection system, comprising:

a housing;

a light source mounted within the housing;

a multiple color wheel mounted in the housing having a plurality of irregularly shaped colored regions having a smallest cross-sectional dimension;

a fiber optic bundle held in a cylindrical shape and having a plurality of optical fibers of substantially uniform cross-sectional dimension, forming an input end and an output end fixed in the housing, the fiber optic bundle including a plurality of fiber optic groups that are interwoven such that the arrangement of the fiber optic groups at the fiber optic bundle's input end is different from the arrangement of the fiber optic groups at the fiber optic bundle's output end, wherein the fiber optic groups are of variable size, with the smallest of such groups having a smallest cross-sectional dimension;

wherein the multiple color wheel is mounted between the light source and the input end of the fiber optic bundle;

wherein the smallest cross-sectional dimension of the smallest fiber optic group is not less than the smallest cross-sectional dimension of the smallest colored region, and the smallest cross-sectional dimension of the smallest colored region is not less than the cross-sectional dimension of the fibers;

a first motor for rotating the color wheel;

a second motor for reciprocating the color wheel laterally with respect to the longitudinal axis of the fiber optic bundle; and a projection lens for receiving light from the fiber optic bundle's output end and imaging the light at a remote location.

* * * * *